United States Patent [19]
Peifer

[11] Patent Number: 5,140,529
[45] Date of Patent: Aug. 18, 1992

[54] REVERSE TORQUE PRELOAD SPINDLE

[76] Inventor: Wilhelm M. Peifer, 2642 Fox Chase, Troy, Mich. 48098

[21] Appl. No.: 566,992

[22] Filed: Aug. 14, 1990

[51] Int. Cl.$^5$ .................... F16F 15/22; G06F 15/20
[52] U.S. Cl. .................... 364/508; 310/51; 73/660
[58] Field of Search .............. 364/506, 508, 565; 310/31, 105; 73/650, 660

[56] References Cited

U.S. PATENT DOCUMENTS

| | | | |
|---|---|---|---|
| 4,365,962 | 12/1982 | Regelsberger | 464/39 |
| 4,456,960 | 6/1984 | Wakai | 364/507 |
| 4,614,117 | 9/1986 | Taniguti | 73/660 |
| 4,683,392 | 7/1987 | MacDonald et al. | 73/660 |
| 4,729,239 | 3/1988 | Gordon | 73/660 |
| 4,847,556 | 7/1989 | Langley | 73/660 |
| 4,892,013 | 1/1990 | Satoh | 73/660 |
| 4,995,139 | 2/1991 | Suzuki | 310/51 |
| 5,012,428 | 4/1991 | Veno et al. | 364/508 |
| 5,033,305 | 7/1991 | Rozelle et al. | 73/660 |
| 5,049,768 | 9/1991 | Andersson | 310/105 |

OTHER PUBLICATIONS

Hirsch; "Variable Dynamic Energy Absorber Control System"; Navy Tech. Cat. No. 0990; Mar. 1986.

Primary Examiner—Parshotam S. Lall
Assistant Examiner—Ellis B. Ramirez
Attorney, Agent, or Firm—Basile and Hanlon

[57] ABSTRACT

A vibration control apparatus includes a rotatable spindle and a generally cylindrical, stationary inductor drum. A magnetic rotor member is mounted on the rotatable spindle for rotation therewith, the rotor member being located within the stationary inductor drum and having a plurality of peripheral, accurately spaced poles separated from said stationary inductor drum by a circumferential air gap. A field coil generating an encircling magnetic flux causes torque transmission between the stationary inductor drum and rotary member. A control system is used to control the current flow to the field coil. As the coil current varies, the eddy current will be effected in direct proportion, thereby controlling the braking or reverse torque preload on the spindle to achieve vibration damping. The current allowed to flow to the coil is limited to an amount necessary to effectuate complete vibration damping or equal to a controlled percentage of the spindle drive input power wherein testing determines the maximum optimum preset value which may vary with specific applications.

10 Claims, 2 Drawing Sheets

REVERSE TORQUE PRELOAD SPINDLE

FIELD OF THE INVENTION

The present invention relates to vibration reducing equipment for use with a rotating drive spindle, such as that sometimes used in a manufacturing process for metal material or other material that produces chips of the material as a by-product, or as an end product of the manufacturing process.

BACKGROUND OF THE INVENTION

Vibration of equipment has been known to cause various problems in operating equipment and in an effort to alleviate these problems, vibration monitoring equipment has been developed and used to monitor the vibration of rotary machines precisely at all times in order to sound an alarm or energize a stopping relay for the rotary machine when any abnormal vibration has occurred. This type of vibration monitoring apparatus can be seen in U.S. Pat. No. 4,614,117. Vibration detection has also been used as a testing mechanism, such as for ball bearings and associated devices as is taught in U.S. Pat. No. 4,729,239. Machine monitoring and control has also been achieved through the use of an eddy current clearance transducing system as disclosed in U.S. Pat. No. 4,847,556. This device combines an eddy current transducer with signal processing circuits and software to achieve useful measurements of turbine machine blade dimensions, such as clearance and transit time. An eddy current coupling having a stepped rotor and coil support is disclosed in U.S. Pat. No. 4,683,392. The eddy current coupling has a field coil for magnetically coupling an inductor drum and rotor to transmit torque between an input shaft connected to a prime mover and an output shaft connected to the load. Typically, the eddy current device is used to provide variable speed to the load when the prime mover operates at a constant speed as is true, for example, for an alternating current induction motor. In operation, the field coil is energized with a direct current through leads to provide an encircling flux. The flux passes from one pole set through the inductor drum, driven by the motor, to the adjacent rotor pole set. The rotation of the drum through the flux generates eddy currents from the drum. The eddy currents react with the flux to transmit torque from the drum to the rotor and, accordingly, to the output shaft. The amount of torque that can be transmitted at a given slip speed and, therefore, at a given output speed, is determined by the field strength of the field coil. While these devices have proved useful in their particular applications, none of them have provided a device for vibration detection and subsequent reduction of the vibration as taught in the present invention.

SUMMARY OF THE INVENTION

On contact between a workpiece and a tool driven by a rotatable spindle, load is applied to the spindle by means of the tool. This load, in many cases, is not uniform and causes oscillation or vibration of the spindle and corresponding hammering or movement of the tool driven by the spindle. The present invention seeks to reduce and/or eliminate the torsional spindle oscillation and/or vibration during interrupted cutting with chip making-type spindles. The present invention detects any oscillation or vibration of the spindle by a sensor. Activation of the sensor causes current to flow through a rotor and coil assembly attached to the spindle. An electrical field is produced between the rotor and a stationary drum surrounding the rotor, which subsequently creates a rotational braking action or reverse torque preload on the spindle. The reverse torque preload on the spindle induces a drag on the spindle to eliminate or greatly reduce torsional vibration of the spindle. By reducing or eliminating the vibration, the hammering of the cutting tools and drive mechanisms in interrupted cutting applications can be effectively reduced. This reduction will extend the cutting tool life as well as the machine tool life while reducing noise associated with the vibration problem.

The invention is based on the theory of eddy current generation by rotation of different magnetic fields. As a field magnet or coil is rotating within an iron drum while current is applied to the coil, eddy current is being generated by the cutting action of magnetic fluctuation. This eddy current generates a second magnetic field whose strength is determined by the primary field and relative speed variance between the two members. The interaction of these two fields causes the stationary drum to follow the field magnet's rotation and, since it is stationary, effects a braking action on the rotor spindle in a similar way to a brake band on a brake drum. As the coil current varies, the eddy current will be affected in direct proportion.

In operation, the present invention may include the steps of rotating a spindle at a predetermined speed, applying a load to the spindle by means of a tool, detecting oscillation of the spindle by a vibration sensor, communicating sensed vibration to an excitation controller, causing current to flow to the rotor and coil through the excitation controller in response to the sensed vibration, creating rotational braking action with the electric field generated between the rotor and drum, exerting a vibration dampening action on the spindle by means of the rotational braking action, and limiting the amount of current to the coil to be equal to a preset value that does not exceed a controlled percentage of the spindle drive input power.

In the present invention, vibration control may be achieved through the use of a manual or automatic system. In a manual system, the operator may engage the vibration control apparatus or eddy current clutch by means of a rheostat which allows for stepless control to a preset maximum value. This value is determined by the size of the spindle drive motor and shall not exceed a percentage of the spindle drive input power. In one embodiment of an automatic system, an encoder is mounted to the front and to the rear of the spindle. The signals of both encoders are received and compared by a microprocessor. If the signals are not received coincident, the microprocessor causes power to be supplied to the eddy current clutch to achieve reverse torque at the front of the spindle, whereby the magnitude of the vibration still in existence will be reduced or eliminated. The microprocessor will effect a current supply to the eddy current clutch to a preset maximum value or until coincidental signals are received from the front and rear encoder. Another embodiment of the automatic system uses a piezoelectric module with is mounted to the spindle to detect torsionally oscillating spindle deformation. Signals from this module are analyzed by a microprocessor which causes power to be supplied to the eddy current clutch in a fashion identical to that described for the encoder above. Use of the present invention results in the reduction and/or elimination of spindle vibration. The manual system of operation may be added to existing spindles without major difficulty. An overriding manual rheostat control may be provided with either of the automatic systems of vibration control described above.

BRIEF DESCRIPTION OF THE DRAWINGS

Other objects, features and advantages of the present invention will become readily apparent to those skilled in the art of vibration control from the following description, reference being made to the accompanying drawings in which like reference numerals refer to like parts throughout the various views, wherein.

DETAILED DESCRIPTION OF THE PREFERRED EMBODIMENT

Figure 1:
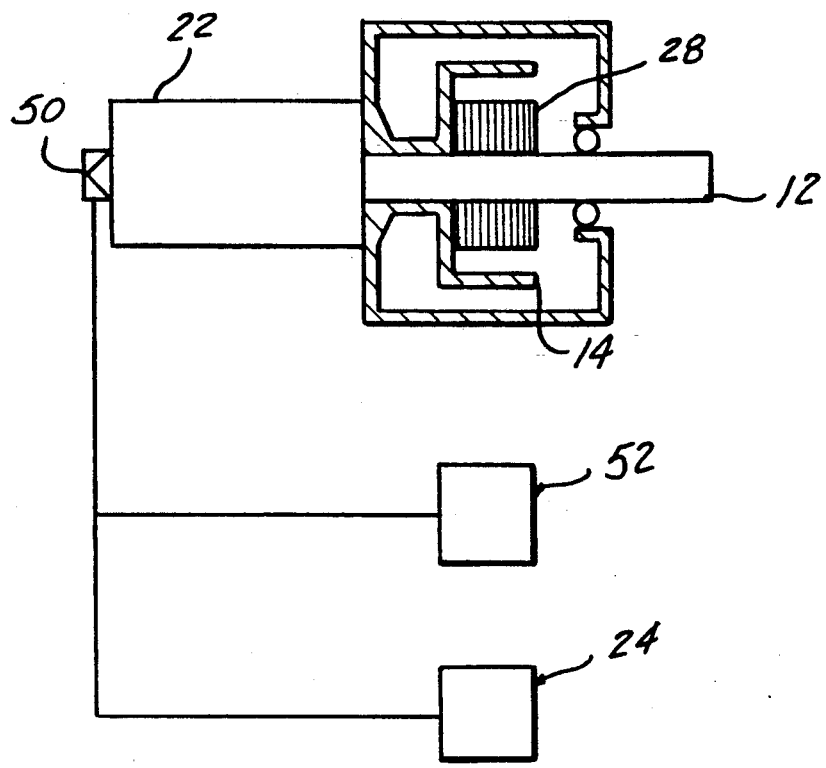
FIG. 1 is a schematic diagram of a reverse torque preload spindle for vibration control according to the present invention.
Figure 2:
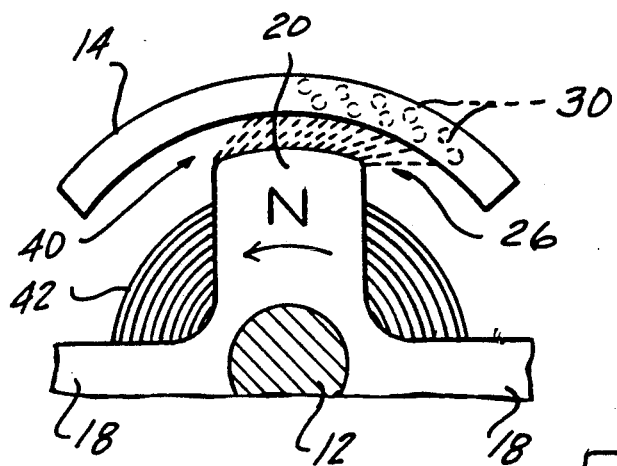
FIG. 2 is a partial cross sectional view showing a coil and rotor connected to a spindle for rotation with respect to a stationary drum according to the present invention.
Figure 3:
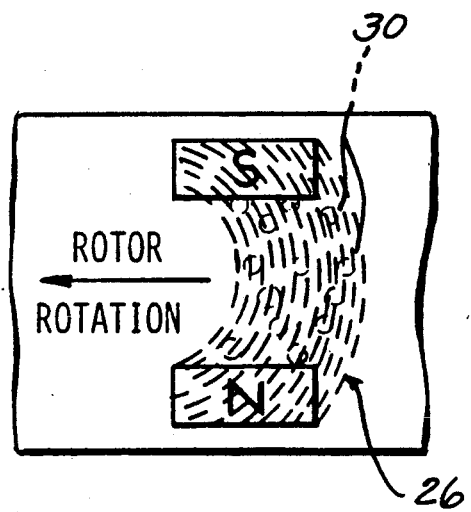
FIG. 3 is a detailed view of eddy currents generated by rotation of the coil and rotor with respect to the stationary drum.

As can best be seen in FIG. 1, the present invention is similar to an eddy current coupling device, where the input shaft typically rotates an inductor drum; however in the present invention, the inductor drum 14 is held stationary. A rotor member 16, commonly referred to as a pole structure, typically includes a plurality of accurately spaced poles 18, 20 and is mounted on the spindle 12 concentric to the stationary inductor drum 14. The flux of a field coil establishes magnetic poles in the rotor 16 and induces eddy currents in the stationary inductor drum 14 as long as there is a relative speed, i.e., slip, between the rotor 16 and drum 14. The electromagnetic interaction of the rotor pole flux and the drum eddy currents transmits torque preload to the spindle 12 to reduce vibration. The degree of energization of the field coil determines the amount of torque transmitted as braking action to the spindle 12 for a given slip speed condition. A cooling medium, such as air or water, carries off heat generated in the apparatus. Spindle 12 is connected to a prime mover, such as an alternating current, constant speed induction motor bolted to the housing 22 of the device and controlled by a drive controller 24. The spindle 12 is supported by bearings in the motor and housing. The magnetic coupling takes place between the stationary inductor drum 14 and a rotor assembly 28 carried by the spindle 12. Stationary inductor drum 14 is a cup-like member of high magnetic permeability and electrical conductivity, the exterior of which is often increased in surface area by the use of cooling fins to dissipate the considerable amount of heat typically generated in an inductor. Rotor assembly 28 on spindle 12 includes a first set 18 and a second set of poles 20 interdigitated with one another. The pole sets 18 and 20 are spaced from the stationary inductor drum 14 by a circumferential air gap 40. A field coil 42 is concentrically mounted radially within the rotor assembly 28 on a field coil support. Coil leads extend through the structure for energizing the coil. In operation, the field coil 42 is energized with direct current through the coil leads to provide an encircling flux 26. The flux 26 passes from one pole set 18 through inductor drum 14 to the adjacent rotor pole set 20. The rotation of the rotor and coil within the stationary drum generates eddy currents 30 in the stationary inductor drum 14 as best seen in FIGS. 2 and 3. The eddy currents 30 react with the flux to transmit torque from the stationary inductor drum 14 to the rotor assembly 28 and, accordingly, to spindle shaft 12. The amount of torque that can be transmitted at a given slip speed and, therefore, at a given spindle speed is determined by the field strength of the field coil 42.

In operation, a vibration sensor 50 detects any oscillation or vibration of the spindle 12. Activation of the vibration sensor 50 is communicated to an excitation controller 52 that subsequently causes current to flow through the rotor and coil assembly 28 attached to the spindle 12. An electric field is produced between the rotor assembly 28 and the stationary drum 14 surrounding the rotor 28, which subsequently creates a rotational braking action or reverse torque preload on the spindle 12. The reverse torque preload on the spindle 12 induces a drag on the spindle 12 to eliminate or greatly reduce torsional vibration of the spindle 12. By reducing or eliminating the vibration, the hammering of the cutting tools and drive mechanisms in interrupted cutting applications can be effectively reduced. This reduction will extend the cutting tool life as well as the machine tool life, while reducing noise associated with the vibration problem. When a field coil 42 is rotated within an iron drum 14 while current is applied to the coil 42, eddy current is being generated by the cutting action of magnetic fluctuation. This eddy current generates a second magnetic field whose strength is determined by the primary field and relative speed variance between the two members. The interaction of these two fields causes the stationary drum 14 to follow the field magnet's rotation and since it is stationary effects a braking action on the rotor 28 and connected spindle 12 in a similar way to a brake band on a brake drum. As the coil current varies, the eddy current will be effected in direct proportion.

The present invention includes a method of controlling vibration and may include the steps of rotating a spindle 12 at a predetermined speed, applying load to the spindle 12 by means of a tool, detecting oscillation of the spindle 12 by a vibration sensor 50, communicating sensed vibration from the vibration sensor 50 to an excitation controller 52. Causing current flow to a rotor assembly 28 by means of the excitation controller 52 in response to communication from the vibration sensor 50, creating an electric field between the rotor assembly 28 and a stationary inductor drum 14 for rotational braking action, and exerting dampening action on the spindle 12 to reduce or eliminate vibration as a result of the rotational braking action. The current to the field coil 42 will be limited to an amount equal to a preset value determined as a controlled percentage of the spindle drive input power. Appropriate testing is required to determining the maximum optimum preset value which may vary with specific applications.

Figure 4:
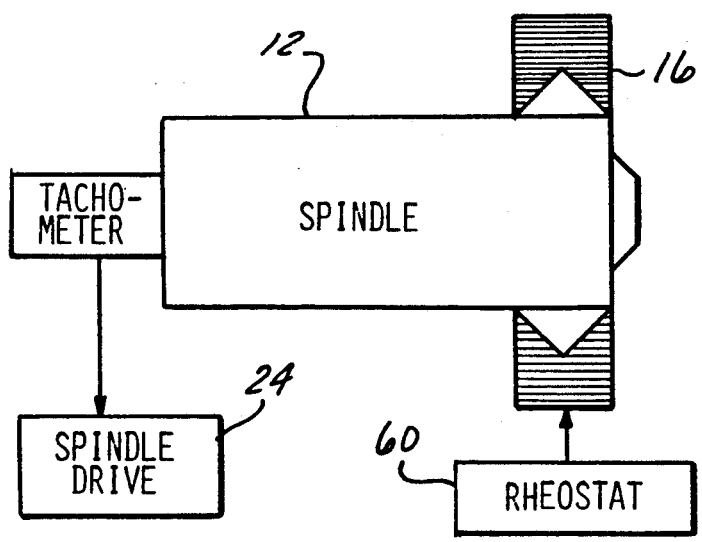
FIG. 4 is a schematic diagram showing manual control of the electric current clutch according to the present invention.

In its simplest form, the present invention may include a manual system of vibration control. In this embodiment of the present invention, an operator can engage the eddy current clutch or torque preload coupling 10 by means of a rheostat 60 which allows for stepless control to a preset maximum value. This value is determined by the size of the spindle drive motor and shall not exceed a percentage of the motor input. This configuration of the present invention can best be seen in FIG. 4 of the drawings.

Figure 5:
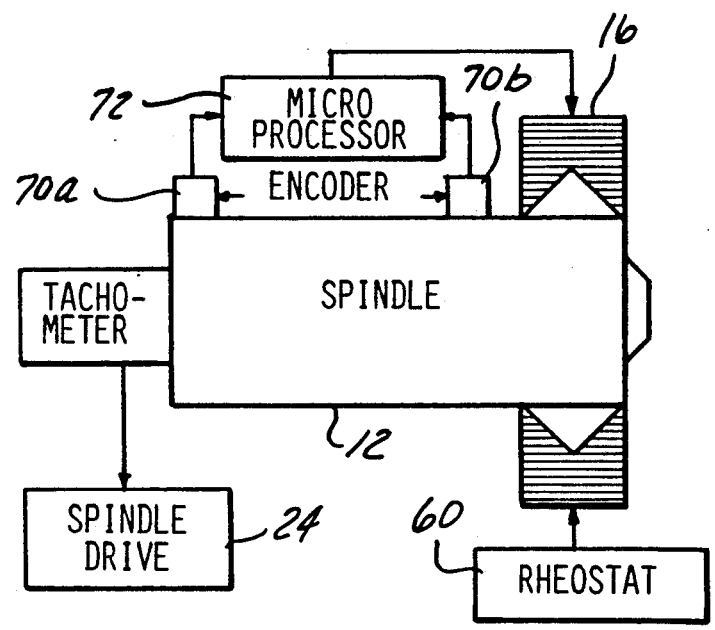
FIG. 5 is a schematic diagram of an encoder pickup control for the electric current clutch according to the present invention.

Referring now to FIG. 5, the present invention can include an automatic system for vibration control. In one such system, an encoder 70 is mounted to the front and to the rear of the spindle 12. The signals of both encoders are received and compared by a microprocessor 72. If the signals are not received coincident, the microprocessor 72 causes power to be supplied to the eddy current clutch 10 to achieve reverse torque at the front of the spindle 12, whereby the magnitude of the vibration still in existence will be reduced or eliminated. The microprocessor 72 will provide a current supply to the eddy current clutch to a preset maximum value or until coincidental signals are received from the front and rear encoder 70a and 70b, respectively.

Figure 6:
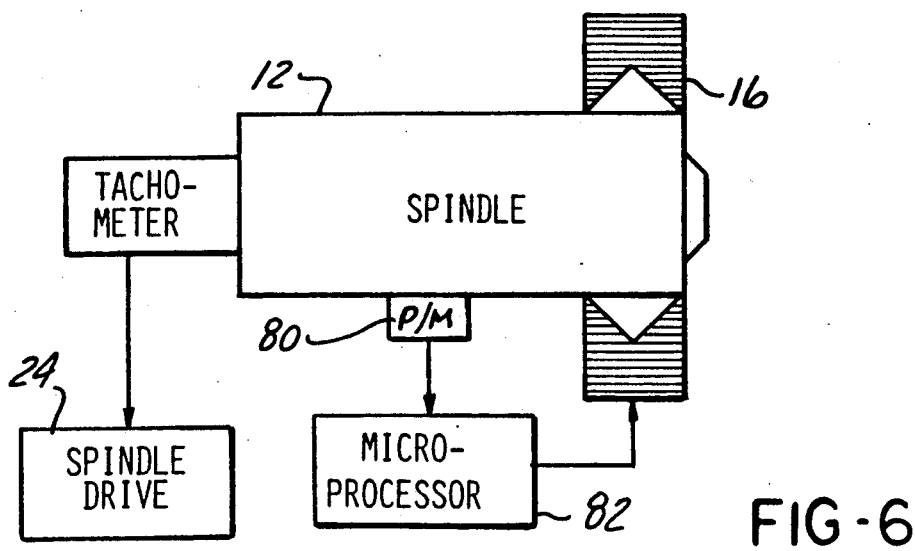
FIG. 6 is a schematic diagram of a piezoelectric pickup control for the electric current clutch of the present invention.

Another embodiment of the present invention can include an automatic system for vibration control as seen in FIG. 6. In this embodiment, a piezoelectric module 80 is mounted to the spindle 12 to detect torsionally oscillating spindle deformation. Signals from this module 80 are analyzed by a microprocessor 82 which causes power to be supplied to the eddy current clutch 10 to achieve reverse torque at the front of the spindle 12, whereby the vibration extent will be reduced or eliminated. The microprocessor 82 will provide a current supply to the eddy current clutch 10 to a preset maximum value or until torsionally oscillating spindle deformation is no longer detected by the piezoelectric module 80. An overriding manual rheostat control 60 may be provided with either automatic system described above.

While this invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims, which scope is to accorded the broadest interpretation permissible under law so as to encompass all such modifications and equivalent structures.

What is claimed is:

1. A vibration control apparatus comprising:
   rotatable spindle means for performing a desired manufacturing operation on a workpiece;
   a generally cylindrical, stationary inductor drum mounted concentric with said rotatable spindle means;
   a magnetic rotor member connected to said rotatable spindle means for rotation therewith, said rotor member being located within said stationary inductor drum and having a plurality of peripheral, accurately spaced poles separated from said inductor drum by a circumferential air gap;
   field coil means generating an encircling magnetic flux causing torque transmission between said inductor drum and said rotor member for applying a predefined steady minimum load to said rotatable spindle means for controlling vibration of said rotatable spindle means resulting from intermittent loads applied to the rotatable spindle means while performing said desired manufacturing operation on said workpiece; and
   control means for supplying current flow to said field coil means.

2. The vibration control apparatus of claim 1, further comprising:
   sensor means for detecting vibration of said rotating spindle.

3. The vibration control apparatus of claim 1, wherein said control means comprises:
   a rheostat for stepless control of current flow to a preset maximum value.

4. The vibration control apparatus of claim 1, wherein said control means comprises:
   an encoder mounted to a front and to a rear of said rotating spindle, said encoders capable of sending an output signal; and
   a microprocessor connected to said encoders for receiving said output signals, such that if said output signals from said front and rear encoders are not received coincident, said microprocessor causes power to be supplied to said coil to produce reverse torque preload at the front of said spindle.

5. The vibration control apparatus of claim 4, wherein said microprocessor will provide a current supply to said rotor up to a preset maximum value.

6. The vibration control apparatus of claim 4, wherein the microprocessor will provide a current supply to said coil until coincidental signals are received from said front and rear encoders and maintain such current supply and vary such current supply in order to sustain coincidental signals.

7. The vibration control apparatus of claim 1, wherein said control means comprises:
   a piezoelectric module mounted to said spindle to detect torsionally oscillating spindle deformation, said piezoelectric module adapted to send an output signal in response to detected torsionally oscillating spindle deformation; and
   a microprocessor for receiving said output signal from said piezoelectric module and for causing power to be supplied to said coil to produce reverse torque preload at the front of said spindle.

8. The vibration control apparatus of claim 7, wherein said microprocessor will provide a current supply to said coil up to a preset maximum value.

9. The vibration control apparatus of claim 7, wherein said microprocessor will provide a current supply to said coil until said output signal is no longer received from said piezoelectric module and maintain such current supply and vary such current supply in order to sustain an absence of output signal from said piezoelectric module.

10. A method of controlling vibration comprising the steps of:
    rotating a spindle at a predetermined speed;
    applying an intermittent load to said spindle while said spindle performs a desired manufacturing operation on a workpiece;
    detecting oscillation of said spindle by means of a vibration sensor;
    communicating between said vibration sensor and an excitation controller;
    causing current to flow to a rotor and coil assembly with said excitation controller in response to communication from said vibration sensor; and creating an electric field between said rotor and a stationary drum encircling said rotor, wherein said electric field causes a rotational braking action thereby exerting a damping action on said rotating spindle to reduce vibration caused by intermittent loading on the rotating spindle while performing said manufacturing operation on said workpiece.

* * * * *